US008911697B2

(12) United States Patent
Soeger et al.

(10) Patent No.: US 8,911,697 B2
(45) Date of Patent: Dec. 16, 2014

(54) CATALYTICALLY ACTIVE MATERIAL AND CATALYTIC CONVERTER FOR THE SELECTIVE CATALYTIC REDUCTION OF NITROGEN OXIDES

(75) Inventors: Nicola Soeger, Nidderau (DE); Katja Adelmann, Darmstadt (DE); Michael Seyler, Rodenbach (DE); Thomas R. Pauly, Clarkston, MI (US); Gerald Jeske, Neuberg (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 14/002,568
(22) PCT Filed: Mar. 1, 2012
(86) PCT No.: PCT/EP2012/053488
§ 371 (c)(1),
(2), (4) Date: Sep. 3, 2013

(87) PCT Pub. No.: WO2012/117042
PCT Pub. Date: Sep. 7, 2012

(65) Prior Publication Data
US 2013/0336866 A1 Dec. 19, 2013

(30) Foreign Application Priority Data
Mar. 3, 2011 (EP) .................................... 11001790

(51) Int. Cl.
B01J 21/06 (2006.01)
B01J 23/10 (2006.01)
B01J 23/14 (2006.01)
B01J 23/34 (2006.01)
B01J 23/38 (2006.01)
B01J 23/70 (2006.01)
B01J 29/00 (2006.01)
B01J 29/04 (2006.01)
B01J 29/06 (2006.01)
B01D 53/94 (2006.01)
B01J 29/46 (2006.01)
B01J 29/22 (2006.01)
B01J 29/74 (2006.01)
B01J 29/70 (2006.01)
B01J 29/78 (2006.01)
B01J 29/40 (2006.01)
B01J 29/26 (2006.01)
B01J 35/04 (2006.01)
B01J 29/44 (2006.01)
B01J 35/02 (2006.01)
B01J 29/48 (2006.01)
B01J 35/00 (2006.01)
B01J 29/24 (2006.01)
B01J 37/02 (2006.01)
B01J 29/76 (2006.01)
B01J 29/18 (2006.01)
B01J 29/88 (2006.01)

(52) U.S. Cl.
CPC ............. *B01J 29/88* (2013.01); *B01D 2255/30* (2013.01); *B01J 29/46* (2013.01); *B01J 29/22* (2013.01); *B01D 53/944* (2013.01); *B01J 29/7415* (2013.01); *B01D 2251/2062* (2013.01); *B01J 29/7057* (2013.01); *B01J 29/7838* (2013.01); *B01D 53/9418* (2013.01); *B01J 29/061* (2013.01); *B01J 29/405* (2013.01); *B01J 29/26* (2013.01); *B01J 2229/32* (2013.01); *B01J 35/04* (2013.01); *B01D 2258/012* (2013.01); *B01J 2229/42* (2013.01); *B01J 29/44* (2013.01); *B01J 2229/186* (2013.01); *B01J 35/023* (2013.01); *B01D 2255/20738* (2013.01); *B01J 29/48* (2013.01); *B01J 35/0073* (2013.01); *B01D 2255/9202* (2013.01); *B01J 29/24* (2013.01); *B01D 2255/50* (2013.01); *B01J 29/7069* (2013.01); *B01J 37/0246* (2013.01); *B01D 2255/90* (2013.01); *B01J 29/7615* (2013.01); *B01J 29/7815* (2013.01); *B01J 29/185* (2013.01); *B01J 29/7638* (2013.01); *B01J 29/7438* (2013.01)
USPC ................. 423/213.2; 423/213.5; 423/239.2; 502/60; 502/64; 502/65; 502/66; 502/73; 502/74; 502/304; 502/324; 502/344; 60/299; 60/301

(58) Field of Classification Search
CPC ........ B01J 21/06; B01J 21/063; B01J 21/066; B01J 21/08; B01J 23/10; B01J 23/14; B01J 23/34; B01J 23/40; B01J 23/48; B01J 23/70; B01J 29/00; B01J 29/04; B01J 29/042; B01J 29/06; B01J 29/061; B01J 29/064; B01D 53/9409
USPC ............. 502/60, 64, 65, 66, 73, 74, 304, 324, 502/344; 423/213.2, 213.5, 239.2; 60/299, 60/301
See application file for complete search history.

(56) References Cited

U.S. PATENT DOCUMENTS 5,077,253 A 12/1991 Chu et al.
5,179,054 A * 1/1993 Schipper et al. ................ 502/67
(Continued)

FOREIGN PATENT DOCUMENTS

EP 1 054 722 A1 11/2000
EP 1 147 801 A1 10/2001
(Continued)

OTHER PUBLICATIONS

International Search Report for Application No. PCT/EP2012/053488 dated Dec. 20, 2012 (i.e., "Later Publication of International Search Report WO/2012/117042 A3").

Primary Examiner — Timothy Vanoy
(74) Attorney, Agent, or Firm — Smith, Gambrell & Russell LLP

(57) ABSTRACT

The invention relates to a catalytically active material for reacting nitrogen oxides with ammonia in the presence of hydrocarbons. The material consists of an inner core (1) made of a zeolite exchanged with one or more transition metals or a zeolite-like compound exchanged with one or more transition metals. The core of the catalytically active material is encased by a shell (2), which is made of one or more oxides selected from silicon dioxide, germanium dioxide, aluminum oxide, titanium oxide, tin oxide, cerium oxide, zirconium dioxide, and mixed oxides thereof.

11 Claims, 3 Drawing Sheets

(56) References Cited

U.S. PATENT DOCUMENTS

Figure 1:
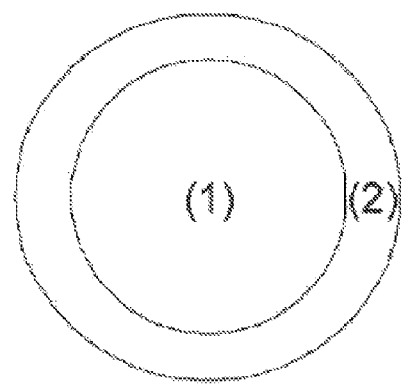

| | | | |
|---|---|---|---|
| 5,228,980 A * | 7/1993 | Stockwell et al. | 208/120.15 |
| 6,677,264 B1 | 1/2004 | Klein et al. | |
| 6,843,971 B2 | 1/2005 | Schäfer-Sindlinger et al. | |
| 6,936,737 B2 | 8/2005 | De Angelis et al. | |
| 8,226,896 B2 | 7/2012 | Pfeifer et al. | |
| 8,480,986 B2 | 7/2013 | Andreasson et al. | |
| 2004/0258594 A1 | 12/2004 | Andreasson et al. | |
| 2005/0196333 A1 | 9/2005 | Schäfer-Sindlinger et al. | |
| 2006/0029535 A1 | 2/2006 | Ott | |
| 2009/0240008 A1 | 9/2009 | Simon | |
| 2010/0077738 A1 | 4/2010 | Cavataio et al. | |
| 2010/0290963 A1 | 11/2010 | Andersen et al. | |
| 2011/0056187 A1 | 3/2011 | Seyler et al. | |
| 2011/0247495 A1 * | 10/2011 | Marco et al. | 95/127 |
| 2011/0305612 A1 | 12/2011 | Muller-Stach et al. | |
| 2012/0275977 A1 | 11/2012 | Chandler et al. | |
| 2013/0089481 A1 | 4/2013 | Sumiya et al. | |

FOREIGN PATENT DOCUMENTS

| | | |
|---|---|---|
| EP | 1 054 722 B1 | 12/2001 |
| EP | 1 961 933 A1 | 8/2008 |
| WO | 99/39809 A1 | 8/1999 |
| WO | 02/20458 A1 | 3/2002 |
| WO | 2009/135588 A1 | 11/2009 |

* cited by examiner

US 8,911,697 B2

CATALYTICALLY ACTIVE MATERIAL AND CATALYTIC CONVERTER FOR THE SELECTIVE CATALYTIC REDUCTION OF NITROGEN OXIDES

The invention relates to a catalytically active material and to a catalyst produced therewith for the selective catalytic reduction of nitrogen oxides in the exhaust gases of diesel engines, which features improved resistance to the hydrocarbons likewise present in the diesel exhaust gas, and to the use thereof for cleaning diesel exhaust gases, especially in automotive applications.

As well as the carbon monoxide (CO) and hydrocarbon (HC) pollutant gases resulting from the incomplete combustion of the fuel, the exhaust gas of diesel engines comprises soot particles (PM) and nitrogen oxides ($NO_x$). In addition, the exhaust gas of diesel engines contains up to 15% by volume of oxygen. It is known that the oxidizable CO and HC pollutant gases can be converted to harmless carbon dioxide ($CO_2$) by passage over a suitable oxidation catalyst, and particulates by passage of the exhaust gas through a suitable soot particle filter. Also well-known in the prior art are methodologies for removal of nitrogen oxides from exhaust gases in the presence of oxygen. One of these "denoxing processes" is what is called the SCR process (SCR=selective catalytic reduction), i.e. the selective catalytic reduction of the nitrogen oxides with the reducing agent ammonia over a catalyst suitable therefore, the SCR catalyst. In this process, ammonia can be added to the exhaust gas stream as such or in the form of a precursor compound decomposable to ammonia under ambient conditions, "ambient conditions" being understood to mean the environment of the compound decomposable to ammonia in the exhaust gas stream upstream of the SCR catalyst. Performance of the SCR process requires a source for provision of the reducing agent, an injection apparatus for metered addition of the reducing agent into the exhaust gas as required, and an SCR catalyst disposed in the flow path of the exhaust gas. The entirety of a reducing agent source, SCR catalyst and injection apparatus disposed on the inflow side of the SCR catalyst is also referred to as an SCR system.

Given the legal limits that will apply in future, an exhaust gas aftertreatment for removal of all pollutant gases emitted by the engine will generally be indispensible for all newly registered diesel vehicles. Thus, it will be necessary for the current applications for diesel exhaust gas aftertreatment to combine diesel oxidation catalyst, diesel particulate filter and SCR systems, and the combination of these units will entail altered operating conditions for the SCR catalyst in particular. Currently, three systems of this kind are being tested: in the "SCRT® System" according to EP 1 054 722, a diesel oxidation catalyst, a diesel particulate filter and an SCR system are arranged in series in the flow direction of the exhaust gas. Alternatively, the SCR system may also be arranged between a close-coupled diesel oxidation catalyst and a diesel particulate filter in the underbody of the motor vehicle (DOC-SCR-DPF) or upstream of a unit composed of diesel oxidation catalyst and diesel particulate filter (SCR-DOC-DPF).

The combination of diesel particulate filter and SCR system in an exhaust gas line means that the SCR catalyst, at particular operation points, is exposed to significantly higher HC concentrations for a prolonged period than was the case in existing applications. There are several causes for these increased HC concentrations:

Firstly, the in-engine combustion is now no longer calibrated with the aim of dispensing with costly exhaust gas aftertreatment stages but from the point of view of power optimization, with equal tolerance of particulates and HCs and of nitrogen oxides as emissions. This causes a certain base level of HC pollution of the exhaust gas aftertreatment system, the exhaust gas already having much higher HC concentrations than in the applications customary to date in which SCR systems were used. Secondly, the diesel particulate filter has to be regenerated at regular intervals, and one way in which this is accomplished is by controlled burnoff of the particulate load. For this purpose, the filter has to be heated to a temperature above the soot ignition temperature. This heat-up is effected by postinjection of fuel into the output piston stroke of the cylinder or into the exhaust gas line, and by catalytic conversion of the uncombusted hydrocarbons on an oxidizing catalyst (called "heat-up catalyst"). Usually, an upstream diesel oxidation catalyst assumes the function of the heat-up catalyst. If this is absent, the SCR catalyst may in some cases also assume heat-up functions. In each case, there are higher HC concentrations upstream of the SCR catalyst during the filter regeneration, since the hydrocarbons injected after ignition are not fully combusted catalytically during the heat-up. In an SCRT® System in which diesel oxidation catalyst and diesel particulate filter are upstream of the SCR catalyst, after a certain service life, there is additionally permanent HC loading of the SCR catalyst attributable to the hydrothermal aging of the oxidation functions in diesel oxidation catalyst and in the optionally catalytically coated filter.

Independently of any regeneration of the diesel particulate filter, further heating measures may be necessary as a result of fuel postinjection, for example to compensate for cold-start delays, and lead to briefly drastically increased HC concentrations upstream of the SCR catalyst.

The result of these effects is that the SCR catalyst in modern exhaust gas cleaning combination systems is exposed to altered operating conditions, the HC contents present in the exhaust gas upstream of the SCR catalyst being much higher than in existing applications. Under these conditions, conventional SCR catalysts generally show a distinct drop in nitrogen oxide conversion performances compared to the activity thereof in exhaust gas which does not contain hydrocarbons. Recently, there have also been descriptions of hydrocarbon-resistant SCR catalysts in the prior art.

For instance, WO 2009/135588 discloses a process for treating diesel engine exhaust gases comprising nitrogen oxides ($NO_x$) and hydrocarbons (HC), comprising: a) the addition of ammonia ($NH_3$) as such or in the form of a compound which gives rise to ammonia under ambient conditions from a source which does not form part of the exhaust gas line to the exhaust gas stream comprising nitrogen oxides and hydrocarbons; and b) the selective reaction of $NO_x$ with the $NH_3$ added to the exhaust gas stream over an SCR catalyst comprising a zeolite exchanged with copper (Cu) and/or iron (Fe), which is characterized in that the hydrocarbons present in the exhaust gas are kept away from the active sites in the catalyst over which the reactions take place by the molecular sieve-like action of the zeolite. The zeolites used are small-pore zeolites, especially ferrierite, chabazite and erionite. Because of their size, the hydrocarbons present in the exhaust gas cannot penetrate into the pore structure of these zeolites.

These hydrocarbon-resistant SCR catalysts feature a much smaller fall in the nitrogen oxide conversion activity thereof in the hydrocarbon-containing exhaust gas compared to the activity thereof in hydrocarbon-free exhaust gas. However, the nitrogen oxide conversions achievable with these catalysts even in hydrocarbon-free exhaust gas are significantly poorer overall than the conventional SCR catalysts. The hydrothermal aging stability of these HC-resistant catalysts is also often significantly inferior to the hydrothermal aging stability of conventional SCR catalysts.

An elevated content of hydrocarbons in the exhaust gas to be cleaned also usually has an adverse effect on the long-term stability of the SCR catalysts. This is especially true of conventional SCR catalysts, the functionality of which is based on the SCR activity of transition metal-exchanged zeolites with moderate or larger pore sizes, for example mordenite, β-zeolite, USY, ZSM-5 or ZSM-20, since these hydrocarbons can be stored in the zeolite skeleton from the exhaust gas. The hydrocarbons present in the exhaust gas are stored in the zeolite skeleton in competition with ammonia at comparatively cold operating temperatures. If the catalyst is then exposed to elevated operating temperatures above the light-off temperature for the catalytic hydrocarbon oxidation, the hydrocarbons stored "burn" in the zeolite. The reaction enthalpy released then produces considerable exothermicity in the catalyst, and the corresponding temperature rise can lead to considerable damage to the catalytically active sites in the zeolitic catalyst.

It was an object of the present invention to provide SCR catalysts which feature improved HC resistance compared to conventional zeolite-based SCR catalysts, but which simultaneously have a higher SCR activity before and after hydrothermal aging than HC-resistant catalysts according to the prior art.

This object is achieved by a catalytically active material consisting of an inner core (1) and a shell (2) surrounding this core, as shown schematically in FIG. 1. The core of the catalytically active material is formed from a zeolite or a zeolite-like compound which has been exchanged with one or more transition metals excluding nickel and chromium, while the shell which surrounds the core is formed from one or more oxides selected from the group consisting of silicon dioxide, germanium dioxide, aluminum oxide, titanium oxide, tin oxide, cerium oxide, zirconium dioxide and mixed oxides thereof.

"Zeolite-like compounds" in the context of this document are understood to mean those which form a typical zeolite structure ("zeolite skeleton") but are not formed or not exclusively formed from aluminum silicate. These include especially silicon aluminum phosphates (SAPO) and aluminum phosphates (ALPO).

The zeolites and zeolite-like compounds for use in accordance with the invention have been exchanged with one or more transition metals—apart from nickel and chromium. This means that, proceeding from the H forms or the $NH_4^+$ forms of the corresponding zeolites or zeolite-like compounds. $H^+$ ions or $NH_4^+$ ions have been exchanged fore corresponding equivalent of transition metal cation by means of ion exchange. However, this does not mean that aluminum, silicon and/or phosphorus atoms which form the basic lattice of the zeolites or of the zeolite-like compounds have been exchanged for transition metals. Instead, the base lattice remains unchanged as a result of this ion exchange.

The core of the inventive catalytically active material consists preferably of a zeolite exchanged with one or more transition metals or of a zeolite-like compound which has been exchanged with one or more transition metals and is selected from the group consisting of β-zeolite, ZSM-5, ZSM-20, USY and MOR. The transition metals are preferably selected from the group consisting of cerium, manganese, iron, copper, silver, gold, platinum, palladium and/or mixtures thereof. Particular preference is given to cerium, iron and copper. The term "transition metals" in the context of the present document includes neither nickel nor chromium.

In one embodiment of the inventive invention, the zeolites or the zeolite-like compounds, before the modification by means of exchange with transition metals, have pores whose maximum diameter is greater than 7 Å. Such zeolites are, for example, β-zeolite, ZSM-20 and USY.

The shell preferably surrounds the core completely. However, the inventive effect also occurs when the shell is merely virtually complete. More particularly, the degree to which the shell surrounds the core is 90 to 100%, more preferably 95 to 100%, based in each case on the surface area of the core.

The shell of the inventive catalytically active material is preferably formed from silicon dioxide, aluminum oxide, cerium oxide, zirconium oxide or cerium-zirconium mixed oxide. Very particular preference is given to silicon dioxide.

In order to ensure sufficient porosity for the passage of the desired reactants, ammonia and nitrogen oxides, through the shell material with simultaneously sufficient barrier action against the hydrocarbons present in the exhaust gas, the oxides in the shell preferably have a particle size distribution with a $d_{50}$ equal to or less than 100 nm. Particular preference is given to oxides having a $d_{50}$ of the particle size distribution less than or equal to 70 nm. Most preferably, the $d_{50}$ of the particle size distribution of the oxide is less than or equal to 20 nm. The $d_{50}$ of the particle size distribution of an oxide indicates that 50% of the total volume of the oxide comprises only those particles whose diameter is less than or equal to the value reported as $d_{50}$.

In ideal embodiments, the core particles of the catalytically active material formed from zeolitic or zeolite-like material are surrounded by a layer of amorphous oxide. An "amorphous oxide" is understood to mean an oxidic material which does not have any long-range structural order.

For production of the catalytically active material, the zeolitic or zeolite-like material which is to form the core is impregnated with a solution comprising one or more soluble precursors of the oxides which are to form the shell in the finished inventive catalytically active material. The oxides which form the shell are then formed directly on the particle core later in the process.

The inventive catalytically active material is obtained by impregnating the zeolite which forms the core or the zeolite-like compound which forms the core with a solution comprising one or more alkoxides of the general formula (I)

$$(RO)_{n-m}MeR'_m \qquad (I)$$

in which
n is 3 or 4 and m<n;
Me is silicon, germanium, aluminum, titanium, tin, cerium or zirconium;
R is $(C_1-C_4)$-alkyl or phenyl; and
R' is $(C_1-C_8)$-alkyl, amino-$(C_1-C_4)$-alkyl, amino-$(C_1-C_4)$-alkyl whose amino group is substituted by amino-$(C_1-C_4)$-alkyl, or $(C_1-C_4)$-alkyl methacrylate.

The oxides are formed as a result of hydrolysis of the alkoxides and condensation of the hydrolysis products to form Me-O chains and networks on the surface of the particles. If the hydrolysis and condensation reactions are complete, the solid obtained in this way is optionally isolated, dried and calcined, and the formation of the oxides is completed.

The abovementioned alkyl groups may be straight-chain or branched and may, for example, be methyl, ethyl, n-propyl, i-propyl, n-butyl or i-butyl. $(C_1-C_8)$-Alkyl may additionally, for example, also be pentyl, hexyl, heptyl or octyl.

R is preferably methyl, ethyl, isopropyl, butyl or phenyl,
R' is preferably amino-$(C_1-C_4)$-alkyl, especially aminomethyl and aminoethyl, N-(2-aminoethyl)-3-aminopropyl, isopropyl, isobutyl, phenyl, octyl or ($C_1$-$C_4$)-alkyl methacrylate, especially methyl methacrylate, ethyl methacrylate or propyl methacrylate.

More preferably, Me represents silicon. In this case, the alkoxides of the formula (I) used are especially tetraethoxysilane, diisobutyldimethoxysilane. N-(2-aminoethyl)-3-aminopropyltrimethoxysilane, phenyltriethoxysilane, methacryloyloxypropyltrimethoxysilane and triethoxyoctylsilane.

For preparation of the catalytically active material in powder form, the zeolitic core material is preferably impregnated with a solution of the alkoxide in ethanol or in an ethanol-water mixture having up to 50% by weight of water. To complete the condensation reaction, small amounts of a protic acid, for example nitric acid, sulfuric acid, hydrochloric acid or acetic acid, can optionally be added to the mixture. The resulting mixture is dried; the dried material is calcined. This affords the inventive catalytically active material in powder form.

In order to obtain an applicable automotive exhaust gas catalyst, the inventive catalytically active material either has to be applied in the form of a coating to an inert support body or extruded to a mechanically stable honeycomb. The inventive catalytically active material can be suspended, for example, in water and applied to a catalytically inert support body by one of the conventional dipping, suction or pumping processes known to those skilled in the art.

Alternatively, it is also possible to produce the inventive catalytically active material effectively "in situ" in the coating suspension, which is used directly for coating of an inert support body in a conventional dipping, suction or pumping process without intermediate isolation of the catalytically active material. For this purpose, for example, the zeolitic core material is suspended in water and an ethanolic solution of the alkoxide is added to the resulting suspension while stirring. On completion of addition of the ethanolic alkoxide solution, the hydrolysis and condensation reactions can be completed by optionally adding small amounts of a protic acid to the suspension. After an appropriate continued stirring period, the suspension thus produced can be used directly to coat the support body.

In the case of production of supported catalysts comprising a coating of the inventive catalytic material, it is preferable to undertake any adjustment of the particle size of the zeolitic base material necessary for coating reasons by grinding before the production of the oxidic shell, i.e. before addition of the ethanolic alkoxide solution. If the inventive catalytically active material is subjected to a grinding operation, the mechanical stress on the particles may lead to partial or complete separation of core material and shell material and hence to loss of HC resistance in the resulting catalyst.

Catalysts comprising the inventive catalytically active material are especially suitable for reducing the level of nitrogen oxides, comprising nitrogen monoxide and nitrogen dioxide, in hydrocarbon-containing diesel engine exhaust gases. Ammonia or a precursor compound decomposable to ammonia is added as a reducing agent to the exhaust gas to be cleaned. The resulting mixture is of exhaust gas and reducing agent is then passed over a catalyst having a coating comprising the inventive catalytically active material.

Preferably, the exhaust gas to be cleaned, prior to addition of ammonia or a precursor compound decomposable to ammonia, is passed over an oxidation catalyst which is effective for conversion of at least a portion of the nitrogen monoxide present in the exhaust gas to nitrogen dioxide. The oxidation catalyst and any further exhaust gas cleaning units upstream of the SCR catalyst should preferably be selected such that they influence the ratio of nitrogen monoxide and nitrogen dioxide in the exhaust gas to be cleaned such that the exhaust gas to be cleaned, before entry into the SCR catalyst comprising the inventive catalytically active material, has a nitrogen dioxide content among the nitrogen oxides of 30 to 70%. With such a nitrogen dioxide content of the nitrogen oxides, particularly good $NO_x$ conversion to nitrogen is achieved. In this case, the oxidation catalyst which is connected upstream of the inventive SCR catalyst is preferably in the form of a catalytically active coating on a monolithic flow honeycomb and/or on a wall flow filter substrate.

The use of the inventive catalytically active material affords SCR catalysts which are notable for an extremely high tolerance to hydrocarbons, even in exhaust gases with a high HC content.

The invention is illustrated in detail hereinafter with reference to some figures and examples. The figures show:

FIG. 1: Schematic diagram of a particle of the inventive catalytically active material consisting of an inner core (1) which is formed from a zeolite exchanged with one or more transition metals or from a zeolite-like compound exchanged with one or more transition metals; and a shell (2) which surrounds this core and is formed from one or more oxides selected from the group consisting of silicon dioxide, germanium dioxide, aluminum oxide, titanium oxide, tin oxide, cerium oxide, zirconium oxide and mixed oxides thereof.

Figure 2:
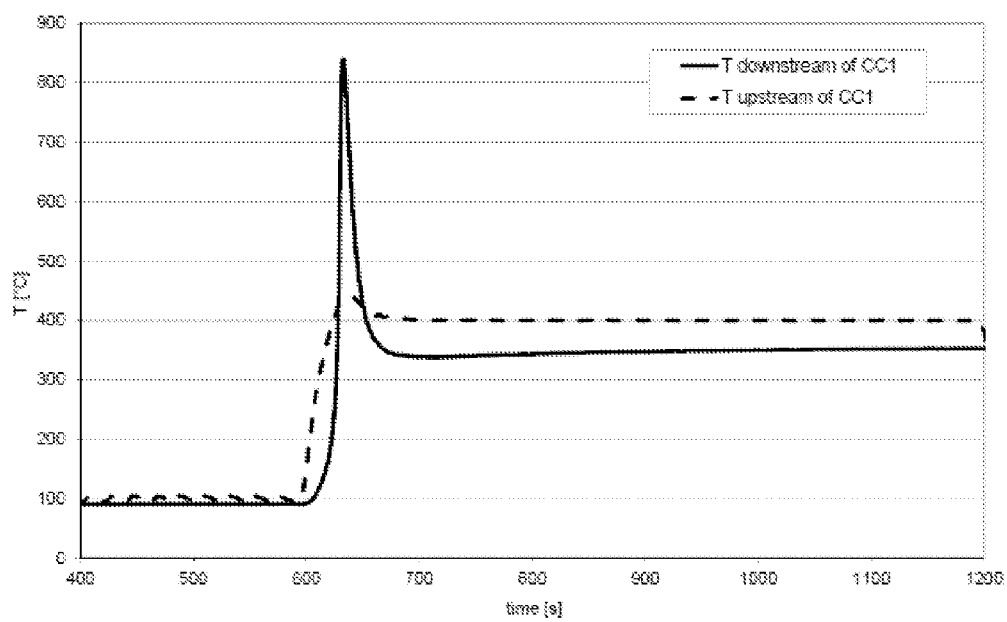
Figure 3:
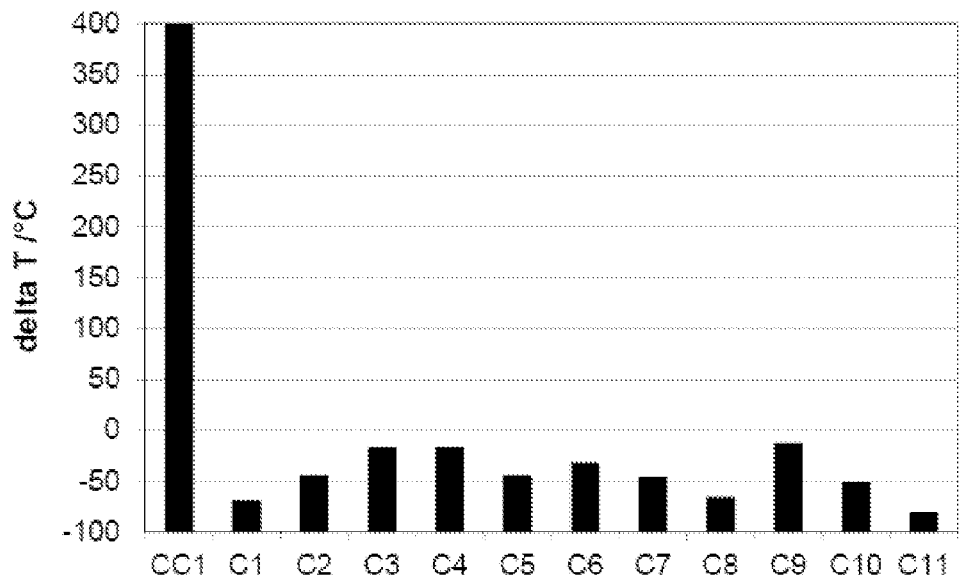
Figure 4:
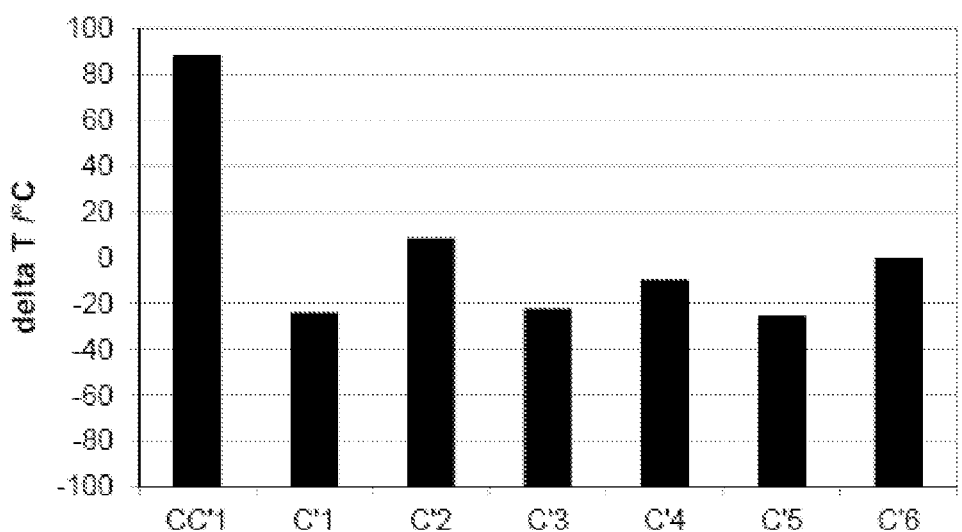
Figure 5:
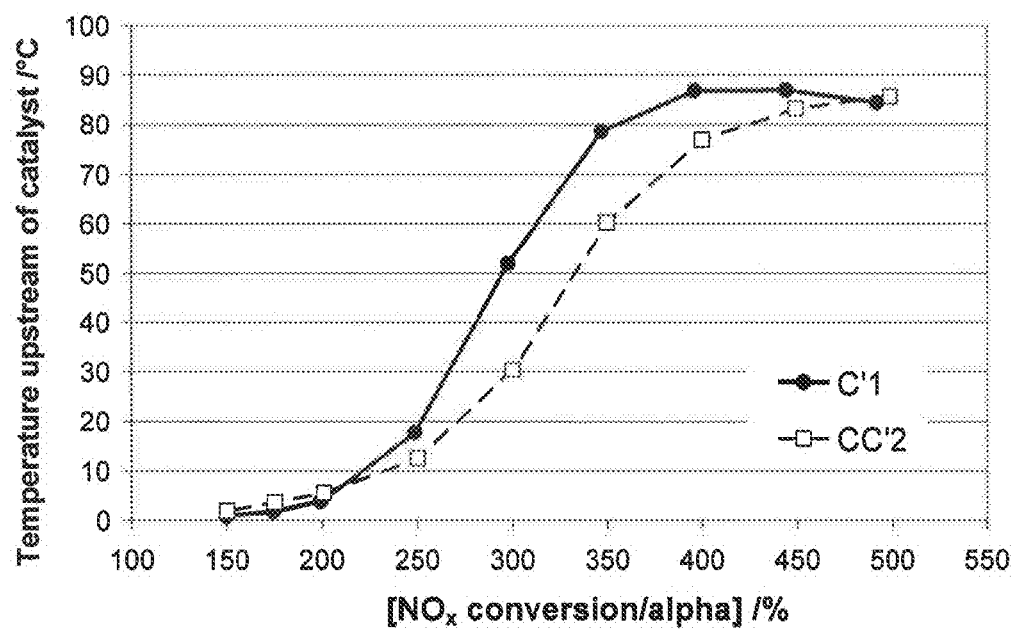

FIG. 2: The exhaust gas temperature upstream and downstream of an SCR catalyst according to the prior art (CC1), which has been laden with hydrocarbons before commencement of the measurements: the rise in the reactor temperature/temperature upstream of catalyst to 400° C. leads to a distinct exotherm caused by HC burnoff;

FIG. 3: the temperature difference $\Delta T$=T(downstream of catalyst)−T(upstream of catalyst) between the exhaust gas temperature upstream and downstream of catalyst when the catalyst has been laden with hydrocarbons before commencement of the measurement, after raising the reactor temperature/temperature upstream of catalyst to 400° C.: comparison of the exotherm produced by HC burnoff over the inventive catalysts C1 to C11 and a catalyst according to the prior art (CC1) in the freshly produced state;

FIG. 4: the temperature difference $\Delta T$=T(downstream of catalyst)−T(upstream of catalyst) between the exhaust gas temperature upstream and downstream of catalyst when the catalyst has been laden with hydrocarbons before commencement of the measurement, after raising the reactor temperature/temperature upstream of catalyst to 400° C.: comparison of the exotherm produced by HC burnoff over the inventive catalysts C'1 to C'6 and a catalyst according to the prior art (CC'1) in the hydrothermally aged state;

FIG. 5: the $NO_x$ conversion of the previously hydrothermally aged catalysts CC'2 (prior art) and C'1 (inventive) normalized to the α value in the non-hydrocarbon-containing exhaust gas.

Comparative Example 1

A coating suspension for a commercially available SCR catalyst based on iron-exchanged β-zeolite was produced. For this purpose, a commercial $SiO_2$ binder, a commercial boehmite binder (as coating aid, iron(III) nitrate nonahydrate and commercially available β-zeolite having a molar $SiO_2$/$Al_2O_3$ ratio (SAR) of 25 were suspended in water and, in a conventional dipping process, applied to a ceramic flow honeycomb having 62 cells per square centimeter and a cell wall thickness of 0.17 millimeter. The coated component was calcined first at 350° C. for 15 minutes, then at 500° C. for the duration of 2 hours. The coating in the catalyst CC1 thus obtained consisted to an extent of 90% of β-zeolite and had an iron content, calculated as $Fe_2O_3$, of 4.5% by weight.

Comparative Example 2

An HC-resistant SCR catalyst according to WO 2009/135588 was produced. For this purpose, a commercially available, small-pore zeolite of the ferrierite type having a molar $SiO_2/Al_2O_3$ ratio (SAR) of 20 was slurried in water. Iron(III) nitrate nonahydrate was added to the suspension. After grinding, this suspension was used to coat a monolithic flow honeycomb having 62 cells per square centimeter and a cell wall thickness of 0.17 millimeter in a conventional dipping process. The coated component was calcined first at 350° C. for 15 minutes, then at 500° C. for 2 hours. This coating of the catalyst CC2 thus obtained consisted of ferrierite having an iron content of 4.5%, calculated as $Fe_2O_3$.

Example 1

In a first step, iron was introduced into a commercially available β-zeolite (CP814T from Zeolyst) by way of liquid ion exchange. For this purpose, the commercially available β-zeolite was suspended in water, and iron(III) nitrate nonahydrate was added to the suspension. The suspension was stirred over the course of 20 hours and then dried at 80 to 90° C. The solid thus obtained was then calcined at 350° C. for a period of 10 minutes and at 500° C. for a period of 2 hours. The finished iron-exchanged β-zeolite contained 5% by weight of iron, calculated as $Fe_2O_3$.

1 kg of the previously prepared iron-exchanged β-zeolite was contacted in a powder impregnation step with a solution comprising 7.5 g of tetraethoxysilane and 2.5 g of water in ethanol (60%). The amount of the solution used was matched to the water absorption of the zeolite, such that a moist but free-flowing powder was obtained. This powder was dried and calcined at 50° C. over a period of 6 hours, then at 120° C. over a period of 2 hours and finally at 500° C. over period of 2 hours.

The powder thus obtained was resuspended in water and, after addition of 10% by weight of silica sol (calculated at $SiO_2$ and based on the total amount of solids in suspension) as a binder, applied as a coating to a ceramic flow honeycomb having 62 cells per square centimeter and a cell wall thickness of 0.17 millimeter in a conventional dipping process. The catalyst C1 thus obtained was postcalcined at 350° C. for a period of 10 to 15 minutes, then at 500° C. for a period of 2 hours.

Example 2

Entirely analogously to example 1, a further catalyst $O_2$ was prepared, except that the impregnating solution used was a solution of 8.1 g of N-(2-aminoethyl)-3-aminopropyltrimethoxysilane and 2.7 g of water in 210 g of ethanol.

Example 3

Entirely analogously to example 1, a further catalyst C3 was prepared, except that the impregnating solution used was a solution of 7.4 g of diisobutyldimethoxysilane and 2.5 g of water in 210 g of ethanol.

Example 4

Entirely analogously to example 1, a further catalyst C4 was prepared, except that the impregnating solution used was a solution of 8.7 g of phenyltriethoxysilane and 2.9 g of water in 210 g of ethanol.

Example 5

Entirely analogously to example 1, a further catalyst C5 was prepared, except that the impregnating solution used was a solution of 9.0 g of methacryloyloxypropyltrimethoxysilane and 3.0 g of water in 210 g of ethanol.

Example 6

Entirely analogously to example 1, a further catalyst C6 was prepared, except that the impregnating solution used was a solution of 10.0 g of triethoxyoctylsilane and 3.3 g of water in 210 g of ethanol.

Example 7

As in the above examples, iron was first introduced into a commercially available β-zeolite by way of liquid ion exchange. The method and raw materials corresponded to the procedure specified in example 1. The finished iron-exchanged β-zeolite contained 5% by weight of iron, calculated as $Fe_2O_3$.

In a first vessel, a coating suspension of 1 kg of the previously prepared iron-exchanged β-zeolite in water was produced. The pH of the coating suspension was adjusted to 4 with acetic acid.

In a second vessel, an impregnating solution containing 7.5 g of tetraethoxysilane and 2.5 g of water in 252 g of ethanol was prepared.

The two solutions were combined in a controlled manner in an injection system with a constant pH. After addition of 10% by weight of silica sol (calculated as $SiO_2$ and based on the total amount of solids in suspension) as a binder, the suspension was used to coat a ceramic flow honeycomb having 62 cells per square centimeter and a cell wall thickness of 0.17 millimeter by a conventional dipping process. The resulting catalyst C7 was calcined first at 350° C. for a period of 10 to 15 minutes, then at 500° C. for a period of 2 hours.

Example 8

Analogously to example 7, a further catalyst C8 was prepared, except that the impregnating solution contained 70.5 g of tetraethoxysilane in 125 g of ethanol.

Example 9

Analogously to example 7, a further catalyst C9 was prepared, except that the impregnating solution contained 7.2 g of tetraethoxysilane in 180 g of ethanol and the pH of the coating suspension was adjusted to a value of 7.

Example 10

Analogously to example 8, a further catalyst C10 was prepared, except that the impregnating solution contained 72.7 g of tetraethoxysilane in 108 g of ethanol and the pH of the coating suspension was adjusted to a value of 7.

Example 11

Analogously to example 8, a further catalyst C11 was prepared, except that the impregnating solution contained 73.3 g of tetraethoxysilane in 115 g of ethanol and the pH of the coating suspension was adjusted to a value of 2.

All the catalysts C1-C11 prepared and the comparative catalyst CC1 were subjected in the freshly prepared state to a study of HC resistance under the conditions which follow.

For this purpose, drill cores of the catalysts prepared having a diameter of one inch and a length of 3 inches were contacted with hydrocarbons on an engine test bed at 100° C. for a period of 60 minutes. Subsequently, the drill cores were preconditioned in a model gas system at reactor temperature 100° C. for 10 minutes (10% $O_2$, 10% $CO_2$, 5% $H_2O$, balance $N_2$, total flow rate 4 $m^3$/h). Then the reactor temperature was raised to 400° C. with the same gas mixture within 30 seconds. The temperature of the exhaust gas 5 millimeters upstream of entry into the catalyst drill core and the temperature of the exhaust gas 3 inches beyond the drill core was evaluated as a measure of the exothermicity which had arisen.

FIG. 2 shows, by way of example, the exhaust gas temperature 5 millimeters upstream of entry into the comparative catalyst CC1 and the measured exhaust gas temperature 76.2 millimeters beyond the comparative catalyst CC1. Shortly after raising the reactor temperature from t=600 sec, a distinct exotherm is observed, which is reflected in a rise in the exhaust gas temperature downstream of catalyst to more than 800° C.

In order to be able to better compare the exotherms produced by the catalysts, inaccuracy in the temperature control was taken into account by forming the temperature difference $\Delta T$ between the temperature upstream of catalyst and the temperature downstream of catalyst, based on the definition $\Delta T=T(\text{downstream of catalyst})-T(\text{upstream of catalyst})$. Here. T(upstream of catalyst) was the exhaust gas temperature 5 millimeters upstream of the drill core and T(downstream of catalyst) was the temperature of the exhaust gas 76.2 millimeters beyond the drill core. The temperatures were recorded at a time $t_{upstream\ of\ catalyst}=t_{max,\ upstream\ of\ catalyst}$ or $t_{downstream\ of\ catalyst}=t_{max,\ downstream\ of\ catalyst}$ when the temperature maximum upstream of downstream of catalyst was present.

FIG. 3 shows a comparison of the temperature differences determined for the catalysts C1 to C11 and CC1 prepared, in the freshly prepared state. The evaluation by the above-described method leads to negative temperature differences in the case of the inventive catalysts. These result from the fact that the temperature difference caused by the heat of reaction is masked by the regular heat loss through the reactor, which is not thermally insulated in this case. Over the present inventive catalysts HC burnoff produces no or almost no heat of reaction, and so the heat loss found via the reactor which is not thermally insulated is so high that the exhaust gas downstream of the catalyst specimen is colder than upstream of the catalyst specimen. Overall, it is thus found that no significant exothermicity is produced over the inventive catalysts as a result of the burnoff of stored hydrocarbons. The inventive catalysts C1 to C11 are thus all notable for a significant improvement in HC resistance compared to the conventional zeolitic SCR catalyst CC1.

A further drill core was taken from each of catalysts C1 to C6 and comparative catalysts CC1 and CC2. These were subjected to artificial hydrothermal aging in an oven at a temperature of 750° C. over a period of 16 hours in an atmosphere containing 10% by weight of water vapor and 10% by weight of oxygen in nitrogen. After this aging procedure, the resulting catalysts CC'1 and C'1 to C'6 were again subjected to an exothermicity test.

FIG. 4 shows a comparison of the temperature differences determined over the aged catalysts C'1 to C'6 and CC'1. In the hydrothermally aged state too, considerably lower exotherms caused by HC burnoff are observed over the inventive catalysts than over the zeolitic SCR catalyst according to the prior art CC'1. The fact that the SCR catalyst according to the prior art (CC1) also has a significantly lower exotherm after hydrothermal aging can be attributed to the fact that damage to the catalytically active sites has occurred with the aging, and this also adversely affects the capacity for catalytic hydrocarbon combustion. Overall, the inventive catalysts are thus found to be much more HC-resistant than the conventional SCR catalyst. Without exception, they have distinctly improved tolerance to hydrocarbons compared to a conventional iron-exchanged zeolite catalyst according to the prior art.

To test the catalytic activity of the invention catalysts in the SCR reaction, the NO conversion activity of the catalyst prepared in example 1 after artificial hydrothermal aging was studied.

The study was effected in a stationary test on a model gas system with the following gas concentrations:

| Model gas component: | Concentration |
|---|---|
| NO | 500 ppmv |
| $NH_3$ | 450 ppmv |
| $O_2$ | 5% by vol. |
| $H_2O$ | 5% by vol. |
| $N_2$ | Remainder |

The molar ratio of ammonia to the nitrogen oxides is usually defined as alpha in studies of SCR activity:

$$\alpha = \frac{c(NH_3)}{c(NOx)}$$

The gas concentrations listed in the table result in an alpha value of $\alpha=0.85$. The space velocity in the model gas tests conducted was 30 000 $h^{-1}$.

The $NO_x$ conversions measured are reported in the context of this document in a form normalized to the $\alpha$ value, i.e. as $NO_x$ conversion/$\alpha$ value.

FIG. 5 shows the result of the SCR activity test for the previously artificially hydrothermally aged catalyst C'1 compared to the conversion performance of the correspondingly aged comparative catalyst CC'2, which is a more HC-resistant SCR catalyst according to the prior art (WO 2009/135588). The inventive catalyst shows a significant improvement in $NO_x$ conversion performance within the temperature range of 250 to 450° C.

The examples show that it is possible with the inventive catalytically active material and the catalysts which result therefrom to provide SCR catalysts which have a distinct improvement in HC resistance compared to conventional zeolitic SCR catalysts, and with which it is simultaneously possible to achieve considerably higher nitrogen oxide conversion performances than with the HC-resistant SCR catalysts known to date in the prior art.

The invention claimed is:
1. A catalytically active material consisting of an inner core (1) and a shell (2) surrounding this core, wherein the core is formed from a zeolite or a zeolite-like compound which has been exchanged with one or more transition metals excluding nickel and chromium, and wherein the shell is formed from one or more oxides selected from the group consisting of silicon dioxide, germanium dioxide, aluminum oxide, titanium oxide, tin oxide, cerium oxide, zirconium dioxide and mixed oxides thereof.

2. The catalytically active material as claimed in claim 1, wherein the zeolite or the zeolite-like compound is selected from the group consisting of β-zeolite, ZSM-5, ZSM-20, USY and MOR.

3. The catalytically active material as claimed in claim 1, wherein the transition metals are selected from the group consisting of cerium, manganese, iron, copper, silver, gold, platinum, palladium and/or mixtures thereof.

4. The catalytically active material as claimed in claim 1, wherein the $d_{50}$ of the particle size distribution of the oxides in the shell is equal to or less than 100 nm, the $d_{50}$ of the particle size distribution of the oxides being understood such that 50% of the total volume of the oxides comprises only those particles whose diameter is less than or equal to the value reported as $d_{50}$.

5. A process for producing the catalytically active material as claimed in claim 1, comprising the following process steps:
   impregnating the zeolite or the zeolite-like compound which forms the core with a solution comprising one or more alkoxides of the formula (I)

$$(RO)_{n-m}MeR'_m \qquad (I)$$

in which
n is 3 or 4 and m<n;
Me is silicon, germanium, aluminum, titanium, tin, cerium or zirconium;
R is $(C_1-C_4)$-alkyl or phenyl; and
R' is $(C_1-C_8)$-alkyl, amino-$(C_1-C_4)$-alkyl, amino-$(C_1-C_4)$-alkyl whose amino group is substituted by amino-$(C_1-C_4)$-alkyl, or $(C_1-C_4)$-alkyl methacrylate, and
hydrolyzing and condensing the alkoxides, and
drying and calcining the solid resulting from the previous process step to form the corresponding oxides.

6. The process as claimed in claim 5, wherein R is methyl, ethyl, isopropyl, butyl or phenyl.

7. The process as claimed in claim 5, wherein R' is amino-$(C_1-C_4)$-alkyl, N-(2-aminoethyl)-3-aminopropyl, isopropyl, isobutyl, phenyl, octyl or $(C_1-C_4)$-alkyl methacrylate.

8. A catalyst consisting of a catalytically inert support body and at least one coating applied thereto, wherein the coating comprises the catalytically active material as claimed in claim 1.

9. A process for reducing the level of nitrogen oxides comprising nitrogen monoxide and nitrogen dioxide in hydrocarbon-containing diesel engine exhaust gases, comprising the process steps of
   adding ammonia or a precursor compound decomposable to ammonia as a reducing agent to the exhaust gas which comprises nitrogen oxides and hydrocarbons and is to be cleaned, and
   passing the resulting mixture of exhaust gas and reducing agent over a catalyst as claimed in claim 8.

10. The process as claimed in claim 9, wherein the exhaust gas, prior to the addition of ammonia or a precursor compound decomposable to ammonia, is passed over an oxidation catalyst which is effective for conversion of at least a portion of the nitrogen monoxide present in the exhaust gas to nitrogen dioxide.

11. The process as claimed in claim 10, wherein the oxidation catalyst is in the form of a catalytically active coating on a monolithic flow honeycomb and/or on a wall flow filter substrate.

* * * * *